(12) United States Patent
Grabon et al.

(10) Patent No.: US 9,310,087 B2
(45) Date of Patent: Apr. 12, 2016

(54) SYSTEM AND METHOD FOR MAINTAINING AIR TEMPERATURE WITHIN A BUILDING HVAC SYSTEM

(75) Inventors: Michel Grabon, Bressolles (FR); Shui Yuan, Simsbury, CT (US); Yuhui Kuang, Shanghai (CN); Dong Luo, South Windsor, CT (US); Stella M. Oggianu, West Hartford, CT (US)

(73) Assignee: Carrier Corporation, Farmington, CT (US)

( * ) Notice: Subject to any disclaimer, the term of this patent is extended or adjusted under 35 U.S.C. 154(b) by 1038 days.

(21) Appl. No.: 13/499,188

(22) PCT Filed: Sep. 29, 2010

(86) PCT No.: PCT/US2010/050713
§ 371 (c)(1),
(2), (4) Date: Jun. 11, 2012

(87) PCT Pub. No.: WO2011/041408
PCT Pub. Date: Apr. 7, 2011

(65) Prior Publication Data
US 2012/0245739 A1 Sep. 27, 2012

Related U.S. Application Data

(60) Provisional application No. 61/246,806, filed on Sep. 29, 2009.

(51) Int. Cl.
*G05D 23/00* (2006.01)
*F24F 3/08* (2006.01)
(Continued)

(52) U.S. Cl.
CPC ... *F24F 3/08* (2013.01); *F24D 5/04* (2013.01); *F24D 5/12* (2013.01); *F24D 19/1087* (2013.01);
(Continued)

(58) Field of Classification Search
CPC ....... F24F 3/08; F24F 2203/02; F25B 29/003; F25B 2400/24; F25B 2400/06; F24D 5/12; F24D 19/1087; F24D 5/04; F24H 4/04; F24H 6/00
See application file for complete search history.

(56) References Cited

U.S. PATENT DOCUMENTS 2,299,531 A * 10/1942 Crawford ......................... 62/157
2,797,068 A * 6/1957 McFarlan ...................... 165/207
(Continued)

FOREIGN PATENT DOCUMENTS

DE 19702903 7/1998
EP 2056025 5/2009
(Continued)

OTHER PUBLICATIONS

EP search report for EP 10821166.5 dated Nov. 5, 2015.

*Primary Examiner* — Ramesh Patel
(74) *Attorney, Agent, or Firm* — O'Shea Getz P.C.

(57) ABSTRACT

A system and method for conditioning air is provided. A building has a hot water source and a cold water source. The system includes at least one heating-cooling unit, a primary water storage device, at least one heat pump, and a controller. The heating-cooling unit transfers heat into or out of air passing within an air handling system of the building. The primary water storage device stores a volume of water within a predetermined temperature range. The primary water storage device is in communication with the hot water source and the cold water source. The heat pump is connected to the primary water storage device and a chilled beam. The controller selectively drives the heat pump to transfer heat between the primary water storage device and the chilled beam. The controller selectively controls the system to transfer heat into or out of the primary water storage device.

21 Claims, 3 Drawing Sheets

(51) Int. Cl.
  *F24D 5/04*    (2006.01)
  *F24D 5/12*    (2006.01)
  *F24D 19/10*   (2006.01)
  *F24H 4/04*    (2006.01)
  *F24H 6/00*    (2006.01)
  *F25B 29/00*   (2006.01)

(52) U.S. Cl.
  CPC .. *F24H 4/04* (2013.01); *F24H 6/00* (2013.01); *F25B 29/003* (2013.01); *F24F 2203/02* (2013.01); *F25B 2400/06* (2013.01); *F25B 2400/24* (2013.01)

(56) References Cited

U.S. PATENT DOCUMENTS

| | | | | |
|---|---|---|---|---|
| 4,030,312 | A | * | 6/1977 | Wallin et al. ............... 62/235.1 |
| 4,111,259 | A | * | 9/1978 | Lebduska ..................... 237/1 R |
| 4,313,312 | A | | 2/1982 | Ito et al. |
| 4,420,947 | A | * | 12/1983 | Yoshino ........................ 62/160 |
| 4,645,908 | A | * | 2/1987 | Jones ............................ 392/340 |
| 4,693,089 | A | * | 9/1987 | Bourne et al. ................. 62/79 |
| 4,739,624 | A | | 4/1988 | Meckler |
| 4,815,527 | A | * | 3/1989 | Meckler ......................... 165/50 |
| 5,622,057 | A | * | 4/1997 | Bussjager et al. ............. 62/173 |
| 6,070,423 | A | * | 6/2000 | Hebert ............................ 62/277 |
| 6,595,011 | B1 | * | 7/2003 | Forgy ............................. 62/91 |
| 7,198,092 | B2 | | 4/2007 | Hauri et al. |
| 7,370,483 | B2 | | 5/2008 | Sienel et al. |
| 8,554,375 | B2 | | 10/2013 | Nerling |
| 2004/0016245 | A1 | * | 1/2004 | Pierson ........................ 62/175 |
| 2005/0028545 | A1 | * | 2/2005 | Hebert ......................... 62/274 |
| 2007/0175234 | A1 | | 8/2007 | Pruitt |
| 2007/0214816 | A1 | | 9/2007 | Fukunaga et al. |
| 2008/0112128 | A1 | | 5/2008 | Holland |
| 2009/0145149 | A1 | * | 6/2009 | Sato et al. ..................... 62/238.4 |
| 2009/0173336 | A1 | * | 7/2009 | Leifer et al. .................. 126/617 |
| 2010/0018228 | A1 | * | 1/2010 | Flammang et al. ........... 62/115 |

FOREIGN PATENT DOCUMENTS

| | | |
|---|---|---|
| GB | 2311849 | 10/1997 |
| GB | 2436867 | 10/2007 |
| JP | 2001248937 | 9/2001 |
| JP | 2004226018 | 8/2004 |
| WO | 9617210 | 6/1996 |
| WO | 2008018397 | 2/2008 |
| WO | 08119893 | 10/2008 |

* cited by examiner

SYSTEM AND METHOD FOR MAINTAINING AIR TEMPERATURE WITHIN A BUILDING HVAC SYSTEM

This patent applications claims priority to PCT Patent Application no. PCT/US10/50713 filed Sep. 29, 2010, which claims priority to U.S. Provisional Patent Application No. 61/246,806 filed Sep. 29, 2009, the disclosures of which are herein incorporated by reference.

BACKGROUND OF THE INVENTION

1. Technical Field

The present method and system relate to methods and systems for maintaining air temperature within a building in general, and to methods and systems for maintaining air temperature within an air handling system of a building in particular.

2. Background Information

In large buildings, traditional air conditioning systems are often centralized. Most centralized air conditioning systems require space for machinery rooms (usually in a basement), which rooms typically include installed chillers. Thermal energy residing within the building is transferred to the outside of the building via cooling towers located outside of the building. Alternatively, air cooled chillers may be installed outside of the building. Fresh air is treated by air handling units installed in one part of the building and air is delivered to each floor by duct work which requires large vertical conduits (between centralized air handling equipment and each floor). This configuration occupies a lot of space in a building and must conform to regulatory constraints relating to fire safety (vertical ducts can potentially facilitate fire propagation between floors).

Heating, ventilating, and air conditioning (HVAC) costs represent a significant percentage of the energy costs required to operate a building. Historically, chilled beam HVAC systems have relied upon heating and cooling coils to add heat to, or take heat out of the chilled beams. The use of heating and/or cooling coils dedicated to the chilled beam HVAC system add to the cost of the system and represent an energy cost during operation.

What is needed is an HVAC system, and method for operating the same, that utilizes heating and cooling sources that have lower installation and operating costs and have minimal system requirements.

SUMMARY OF THE DISCLOSURE

According to one aspect of the present invention a system for conditioning air within an air handling system of a building is provided. The building has a hot water source and a cold water source. The conditioning system includes at least one heating-cooling unit connected to the air handling system, a primary water storage device, at least one heat pump, and a controller. The heating-cooling unit, which includes at least one chilled beam and/or fan coil unit, is operable to transfer heat into or out of air passing within the air handling system of the building. The primary water storage device is operable to store a volume of water within a predetermined temperature range. The primary water storage device is in communication with the hot water source and the cold water source. The heat pump is connected to the primary water storage device and the chilled beam and/or fan coil unit. The controller is adapted to selectively drive the heat pump to transfer heat between the primary water storage device and the chilled beam and/or fan coil unit. The controller is also adapted to selectively control the system to transfer heat into or out of the primary water storage device to maintain the water within the primary storage device within the predetermined temperature range.

According to another aspect of the present invention, a method for conditioning air within an air handling system of a building is provided. The building has a hot water source and a chilled water source. The method comprises the steps of: a) transferring heat into or out of air passing within the air handling system of the building using at least one heating-cooling unit connected to the air handling system, which heating-cooling unit includes at least one chilled beam and/or fan coil unit; b) storing a volume of water within a primary water storage device within a predetermined temperature range, which primary water storage device is in communication with the hot water source and the cold water source; c) transferring heat between the primary water storage device and the chilled beam and/or fan coil unit of the heating-cooling unit; and d) transferring heat into or out of the primary water storage device to maintain the water within the primary storage device within the predetermined temperature range.

DETAILED DESCRIPTION OF THE INVENTION

Figure 1:
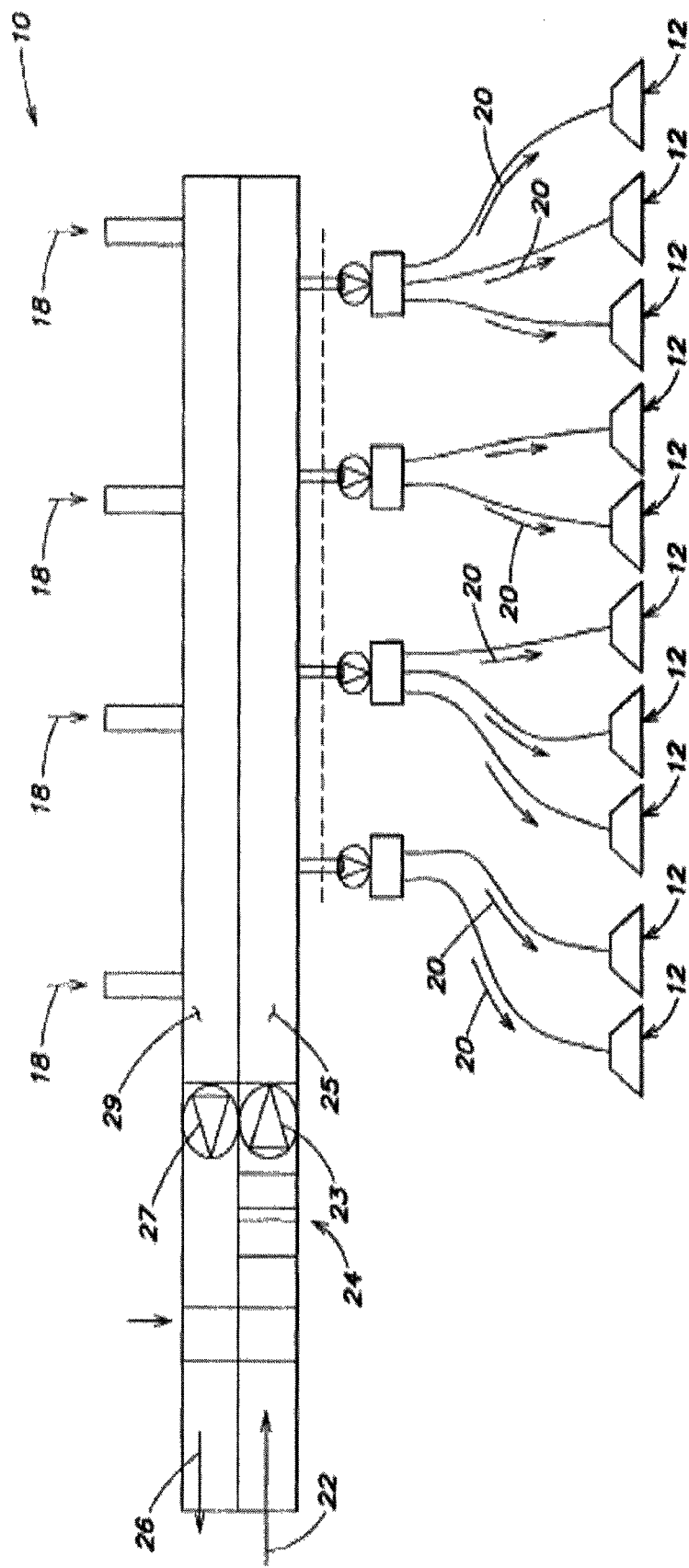
FIG. 1 is a diagrammatic illustration of an air handling system in combination with the present system for conditioning air.
Figure 2:
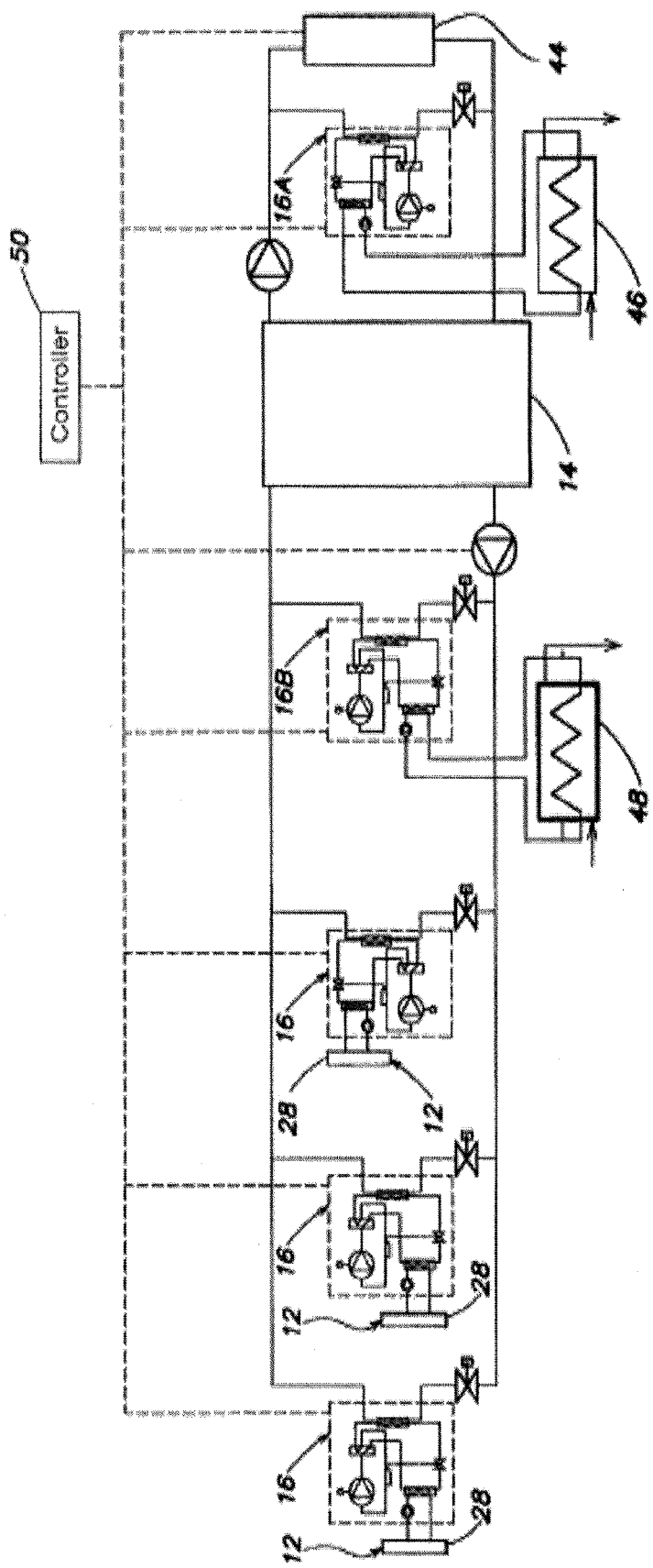
FIG. 2 is a diagrammatic illustration of the present system for conditioning air.

Referring to FIGS. 1 and 2, the present system for conditioning air within an air handling system 10 of a building includes one or more heating-cooling units 12 connected to the air handling system 10, a primary storage device 14, and one or more heat pumps 16 connected to the primary water storage device 14 and the heating-cooling unit 12. The air handling system 10 can be operated (e.g., in cooling mode) in a such way that air entering the building is dry enough to allow a chilled beam or fan coil unit to operate without moisture condensation. In other words, the air handling system is taking care of the latent load of the air while the chilled beam or fan coil unit is addressing the sensible heat of the air.

Referring to FIG. 1, the air handling system 10 is operable to cycle air through the building. Air is returned from the building ("return air" 18) and into the engagement with the heating-cooling unit 12. Air conditioned by a heating-cooling unit 12 is supplied to the building ("supply air" 20) after being heated, cooled, or otherwise conditioned. FIG. 1 diagrammatically illustrates flexible ducts and water piping going out to the heating-cooling units 12 to illustrate the various units 12 that may be placed around the entire building. In some embodiments, the air handling system 10 is configured on a floor by floor basis within multi-floor buildings, where the air handling system for each floor may function independently of other floors. In many instances, the air handling system 10 includes structure (e.g., fan 23 and conduit 25) for drawing fresh outside air 22 into the building, structure 24 for conditioning the moisture content of the air for use in the building (e.g., enthalpy wheel, etc.), and structure (e.g., fan 27 and conduit 29) for exhausting building air 26 to the outside. The present invention is operable with a variety of different air handling systems and is not, therefore, limited to any particular air handling system.

Referring to FIG. 2, each heating-cooling unit 12 includes one or more chilled beams 28 or fan coil units. For ease of description, the term "chilled beam 28" as used herein shall mean chilled beams and/or fan coil units, unless specifically indicated otherwise. The heating-cooling units 12 may be deployed in a plurality of zones disposed throughout the building. Each chilled beam 28 has a water loop having an inlet and an exit to allow the passage of water therethrough, and either has an air inlet and an air exit to allow the passage of air relative to the chilled beam 28, or is disposed within a duct through which supply air is directed. The heating-cooling units 12 may be passive and relay a flow of air from the air handling unit 10 into the zone, or they may be active units that utilize air flow from the handling unit and/or a local means for passing air relative to the chilled beams 28; e.g., a fan. The present system and method are not limited to any particular chilled beam 28 configuration.

Referring to FIG. 2, the primary storage device 14 is a container that contains a volume of water within a predetermined temperature range. The volume capacity of the primary storage device 14 is based on the needs of the building (e.g., expected maximum heating and cooling requirements). In most applications, water stored in the primary storage device 14 is maintained in the predetermined range of about 16-32° C., and at a pressure of about 2-3 bars, which temperature and pressure levels are within the range of water temperatures and pressures typically found within commercial buildings. Consequently, the primary storage device 14 is designed to handle water at the aforesaid temperatures and pressures. Water temperature in the system is low enough to allow each individual heat pump to operate with relatively low condensing temperature in a cooling mode. In particular, the water temperature in the system may be low enough to permit the use of carbon dioxide ($CO_2$) refrigerant based reversible heat pumps, which heat pumps can operate below critical point most of the time. In such a mode, the efficiencies of the $CO_2$ heat pump can be significantly increased. The present invention is not, however, limited to using $CO_2$ type heat pumps, although such heat pumps can be used in a very efficient way.

Referring to FIGS. 2-5, the one or more heat pumps 16 used to transfer heat between the primary storage device 14 and the heating-cooling units 12 are not limited to any particular type of heat pump. In one embodiment (see FIG. 3), the heat pump 16 is a water-to-water heat pump that includes a heat exchanger 29 and a pair of pumps 31, 33 (e.g., variable speed reversible pumps). A first pump 31 is dedicated to moving water through a chilled beam closed loop, and a second pump 33 is dedicated to moving water through a primary storage device closed loop. The heat exchanger 29 provides the interface between the two loops.

Figure 5:
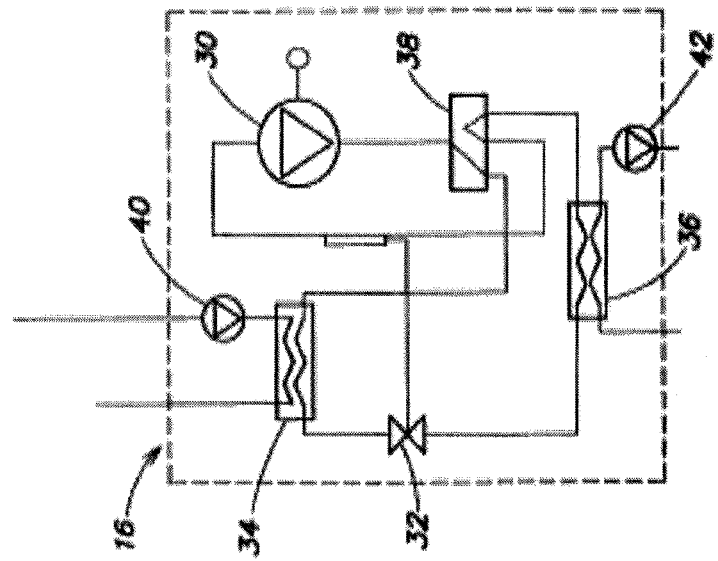
FIG. 5 is a diagrammatic illustration of a heat pump embodiment in a heating mode configuration.
Figure 4:
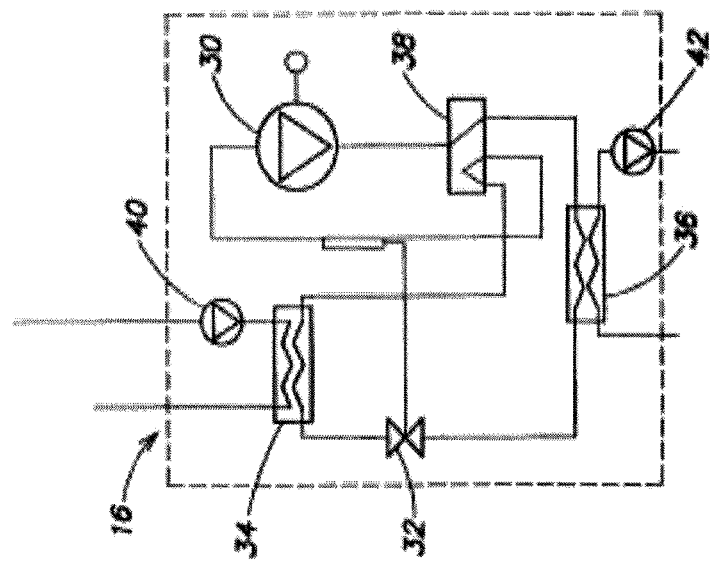
FIG. 4 is a diagrammatic illustration of a heat pump embodiment in a cooling mode configuration.
Figure 3:
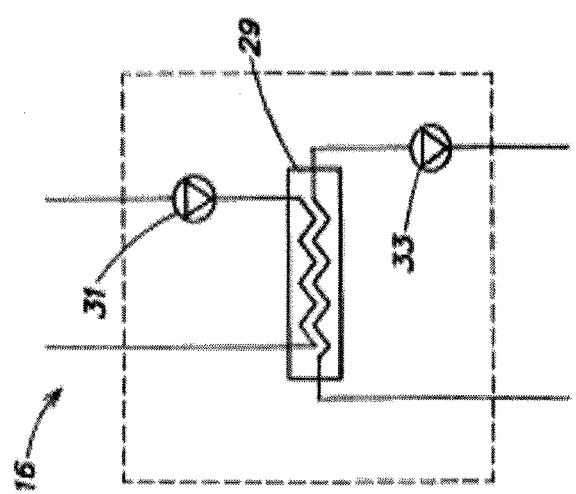
FIG. 3 is a diagrammatic illustration of a heat pump embodiment.

Another example of an acceptable water-to-water heat pump is shown in FIGS. 4 and 5. FIG. 4 illustrates a water-to-water heat pump 16 in a heating mode configuration, and FIG. 5 illustrates a water-to-water heat pump 16 in a cooling mode configuration. Each configuration includes a variable speed compressor 30 (or a fixed speed compressor), an expansion valve 32, a pair of heat exchangers 34, 36, a four-way valve 38, and a pair of water pumps 40, 42. The variable speed compressor 30, the expansion valve 32, and the heat exchangers 34, 36 are connected to one another by lines that contain a working fluid (e.g., refrigerant such as $CO_2$). The four-way valve 38 allows the heat pump 16 to operate in a heating mode or in a cooling mode. One of the water pumps 40 circulates water through a chilled beam closed loop which passes through one of the heat exchangers 34, and the other water pump 42 circulates water through a primary storage device closed loop which passes through the other heat exchanger 36. The above described heat pump 16 embodiments are examples of acceptable heat pumps, and the present system is not limited to using these embodiments.

Now referring to FIG. 2, in some embodiments the primary storage device 14 is connected to an air-source heat pump 44 that operates to maintain the primary storage device 14 within the predetermined temperature range. When the temperature of the water within the primary storage device 14 exceeds the predetermined temperature range, the air-source heat pump 44 can be used to extract the heat from primary storage device 14 and transfer it to an ambient air source (e.g., outside air), provided the ambient air source is at a lower temperature. Conversely, if the ambient air source is at a temperature higher than the water within the primary storage device 14, the air-source heat pump 44 can be used to add heat to the water within the primary storage device 14. In some embodiments, the air-source heat pump 44 includes a reversible variable speed drive pump that can be used to provide a variety of different water flow rates, and can be run in cooling or heating mode. Acceptable air-source heat pumps 44 are known in the industry and the specific type of air-source heat pump suitable for a particular application will depend upon the requirements of that application. In some applications, one or more air-source heat pump 44 can be placed outside of the building. In such outdoor applications, materials such as propane can be safely used as a refrigerant. Combinations of indoor heat pumps 44 (e.g., $CO_2$) and outdoor heat pumps 44 (e.g., propane) can be used.

The primary storage device 14 is in communication with a cold water source disposed within the building. In some embodiments, a heat pump 16A (e.g., like those described above) connects a cold water storage device 46 to the primary storage device 14. The cold water storage device 46 is filled using a building cold water source and may, for example be filled with fresh water that can be subsequently used for flushing toilets. The volume capacity of the cold water storage device 46 is based on the needs of the building (e.g., expected maximum heating cooling and cooling requirements). In most applications, water stored in the cold water storage device 46 is maintained in the range of about 16-32° C., and at a pressure of about 2-3 bars, which pressure level is within the range of water pressures typically found within commercial buildings. Consequently, the cold water storage device 46 is designed to handle water at the aforesaid temperatures and pressures.

The system 10 is designed to provide both cooling and heating. In situations where a majority of zones within the building require cooling, the system water will have tendency to increase its temperature. Under these circumstances, other cooling sources may be used (in a cooling mode) to transfer heat away from the main loop of the system to, for example, the water which is used to flush toilets. A means that can be used to transfer the energy in these instances is a water to water heat pump. The aforesaid source of cooling energy is limited, so if necessary an air cooled heat pump 44 can also be used to cool the main loop of the system.

The primary storage device 14 is also connected to a hot water source disposed within the building. In some embodiments, a heat pump 16B connects a hot water storage device 48 to the primary storage device 14. The hot water storage device 48 is filled using a hot water source disposed in the building. The volume capacity of the hot water storage device 48 is based on the needs of the building (e.g., expected maximum heating cooling and cooling requirements). In most applications, water stored in the hot water storage device 48 is maintained in the range of about 50-70° C., and at a pressure of about 2-3 bars, which pressure level is within the range of water pressures typically found within commercial buildings. Consequently, the hot water storage device 48 is designed to handle water at the aforesaid temperatures and pressures.

In situations where a majority of zones within the building require heating, the water temperature within the main loop of the system has a tendency to decrease. In such cases, other heating sources may be used to compensate main loop water temperature drop. Under these circumstances, other heating sources may be used (in a heating mode) to transfer heat to the main loop of the system from, for example, relatively high temperature sanitary water used in the building. A means that can be used to transfer the energy in these instances is a water to water heat pump. If there is not enough energy in sanitary water to compensate for heating needs of the floor, an air to water heat pump can be used to add additional energy to the main water loop.

In a case when some of the zones require cooling and some of the zones require heating, a situation may occur where the main water loop remains in a constant temperature and in this case no external cooling or heating is required. In these instances, the traditional solution is to cool a part of the building, and to heat a part of the building. Heating and cooling the building requires large amounts of external energy. Using the present system, the energy from one zone can be transferred to another zone, thereby resulting in a significant savings in energy.

The system includes a controller 50 that is adapted to provide control functions including: a) selectively driving one or more heat pumps 16 to transfer heat between the primary storage device 14 and the one or more chilled beams 28 of the heating-cooling unit 12; and b) selectively controlling the system to transfer heat into or out of the primary storage device 14 to maintain the water within the primary storage device 14 within a predetermined temperature range; e.g., by controlling the heat pumps 16A, 16B and valves associated with the cold water storage device 46 and the hot water storage device 48. Thermal sensors disposed throughout the system can be used to provide input into the controller 50 regarding the need to transfer heat into or out of the primary storage device 14, and into and out of the cold and hot water storage devices 46, 48 as will be explained below.

In those system embodiments that include an air-source heat pump 44, the controller 50 is adapted to control the transfer of heat between the water within the primary storage device 14 and ambient air.

In those system embodiments that include a hot water storage device 48, the controller 50 is adapted to selectively control transfer of heat from the hot water storage device 48 to the primary storage device 14 via a heat pump 16B to increase the temperature of water disposed within the primary storage device 14. In those system embodiments that include a cold water storage device 46, the controller 50 is adapted to selectively control transfer of heat to the cold water storage device 46 from the primary storage device 14 via a heat pump 16A to decrease the temperature of water disposed within the primary storage device 14.

The controller 50 may include a single processor programmed (or having equivalent control hardware) to control the functions of the working fluid hardware (e.g., heat pumps, valves, etc.) associated with the embodiments described above. Alternatively, the controller 50 may collectively include a plurality of processors that are programmed (or have equivalent control hardware) to collectively control the functions of the working fluid hardware; e.g., a system controller in communication with processors disposed in heat pumps 16, automated valves, etc.

In the operation of the present system, the primary storage device 14 has a temperature range defined by an upper temperature limit (Tpsdu) and a lower temperature limit (Tpsdl). In summer months when the cooling requirements are greater, the temperature of the primary storage device is maintained no higher than the upper temperature limit (Tpsdu), while in the winter months when heating requirements are greater, the temperature of the primary storage device is maintained no lower than the lower temperature limit (Tpsdl).

In those embodiments utilizing an air-source heat pump 44, if the temperature of the water within the primary storage device 14 is above its upper limit (Tpsdu), and the ambient air temperature is lower than the upper temperature limit (Tpsdu) for a given period of time, then the air-source heat pump 44 can be operated by the controller 50 to transfer heat from the water within the primary storage device 14 to the ambient air. Likewise, if the temperature of the water within the primary storage device 14 is below its lower limit (Tpsdl) and the ambient air temperature is higher than the lower limit (Tpsdl) for a given period of time, then the air-source heat pump 44 can be operated by the controller 50 to transfer heat from the ambient air to the water within the primary storage device 14. If the cooling or heating requirements cannot be met by the air-source heat pump 44 for a given period of time, the additional requirements of the system can be met by utilizing the cold water storage device 46 or the hot water storage device 48 within the building.

In those system embodiments that include a cold water storage device 46, the controller 50 is used to maintain cold water (e.g., toilet flush water) within the cold water storage device 46 at a temperature that is cooler than Tpsdu, and preferably cooler than Tpsdl. Automated valves connected to a building cold water source can be controlled to add and remove water from the cold water storage device 46 as necessary. If the temperature of the water within the primary storage device 14 exceeds its upper temperature limit (Tpsdu) for a given period of time, then the controller 50 is adapted to transfer heat away from the primary storage device 14 and to the cold water storage device 46 through one or more heat pumps 16A. Once the temperature of the water within the primary storage device 14 is back within the acceptable temperature range, the controller 50 halts heat transfer via the heat pumps 16A.

In those system embodiments that include a hot water storage device 48, the controller 50 is used to maintain hot water within the hot water storage device 48 at a temperature that is hotter than Tpsdl, and preferably hotter than Tpsdu. Automated valves connected to a building hot water source can be controlled to add and remove water from the hot water storage device 48 as necessary. If the temperature of the water within the primary storage device 14 falls below its lower temperature limit (Tpsdl) for a given period of time, then the controller 50 is adapted to transfer heat to the primary storage device 14 and away from the hot water storage device 48 through one or more heat pumps 16B. Once the temperature of the water within the primary storage device 14 is back within the acceptable temperature range, the controller 50 halts heat transfer via the heat pumps 16B.

In those system embodiments that utilize a water-to-water heat pump 16 as is shown in FIGS. 4 and 5, the controller 50 is adapted to control operation of the heat pump 16 including operation of the variable speed compressor 30 and the four-way valve 38. For example, in the heating mode configuration shown in FIG. 5, the four-way valve 38 is operated to direct the working fluid exiting the compressor 30 to the heat exchanger 34 in communication with the chilled beam closed loop, where heat from the working fluid is transferred to the water within the chilled beam loop via the heat exchanger 34. The working fluid exits the heat exchanger 34 and enters the expansion valve 32. From the expansion valve 32, the working fluid can either go to the heat exchanger 36 in communication with the primary storage device closed loop or can bypass that heat exchanger 36 and can go directly back to the variable speed compressor 30. Heat from the water within the primary storage device loop is transferred to the working fluid as it passes through the heat exchanger 36. As a result of the cycle, the heat pump 16 transfers heat from the primary storage device 14 ultimately to the chilled beam 28, which in turn increases the temperature of the air within the HVAC system zone.

In the cooling mode configuration shown in FIG. 4, the four-way valve 38 is operated to direct the working fluid exiting the compressor 30 to the heat exchanger 36 in communication with the primary storage device closed loop, where heat from the working fluid is transferred to the water within the primary storage device loop via the heat exchanger 36. The working fluid exits the heat exchanger 36 and enters the expansion valve 32. From the expansion valve 32, the working fluid goes to the heat exchanger 34 in communication with the chilled beam closed loop. Heat from the water within the chilled beam closed loop can be transferred to the working fluid as it passes through the heat exchanger 34. As a result of the cycle, the heat pump 16 transfers heat to the primary storage device 14 and ultimately away from the chilled beam 28, which in turn decreases the temperature of the air within the HVAC system zone.

While various embodiments of the system and method for maintaining air temperature within a building HVAC system have been disclosed, it will be apparent to those of ordinary skill in the art that many more embodiments and implementations are possible within the scope of the method. For example, the present system has the ability to remove heat from a first zone of the building and transfer that heat to the primary storage device 14. If other zones of the building require heat input, the present system can utilize heat removed from certain zones to add heat to other zones via the primary storage device 14.

Individual water-to-water reversible heat pump and associated air delivery systems (which deliver the air to each chilled beam or fan coil unit) are typically sized to fit above the false ceiling on the particular floor where they are located. It is important to note that in most buildings the available space above a false ceiling has a tendency to be less above the office areas than elsewhere, because of desire to optimize the work space of the occupants. For example, in many buildings the floor to floor distance is approximately 3 meters and the floor to ceiling distance is approximately 2.5-2.75 meters. That leaves 0.5 to 0.25 meters of space above the false ceiling. This relatively confined space is used to house all HVAC ductworks, piping, and electrical/communication wiring. In many instances, this space is not big enough to accommodate a reversible water-to-water heat pump and an associated air delivery system. However, above bathroom facilities, the space above the false ceiling is often larger; e.g., approximately 1.0 meter.

Using the present system, however, the system can be implemented in a modular manner where a reversible water-to-water heat pump and an appropriate air delivery system (e.g., configured as a modular unit) can be placed above each toilet within a restroom within the building. In building standards, the number of toilets is proportional to the occupant number (usually one toilet for ten people). Under the present system, the physical size of a water-to-water heat pump and air delivery systems as well as their capacity (around 2 kW) can be selected in such a way that the single "module" can be placed in a space above a single toilet and provide comfort (cooling and heating) to ten people. The number of modules can be increased with the number of toilets. In this embodiment, the modular HVAC equipment is installed in a space (e.g., above the toilet) which is otherwise not used. It also means that it is easy to service the equipment without entering the office space. Packaging the equipment as a modular unit is facilitated because toilet sizes are typically standardized and the number of toilets per building is proportional to the number of the people in a floor. The present system can be tailored to the number of people within the building without need for a specific machinery room.

Air-to-water heat pumps (to maintain water loop temperature at a desired temperature level as described above), as well as fresh air handling equipment (e.g., air-to-water heat pump, energy recovery device etc.) can also be placed inside the building (on the same floor) in a specific room or if space is available in a duct. Under the present system, therefore, the air conditioning requirements of the building can be addressed on a floor-by-floor basis (including fresh air). Under the present system, there is limited or no need for vertical ducting in a building (an issue for fire protection requirements), and the need for a central machinery room is avoided. Consequently, the cost and space requirements associated vertical ducting and a central machinery room are avoided.

What is claimed is:

1. A system for conditioning air within an air handling system of a building, which building has a hot water source and a cold water source, the conditioning system comprising:
    at least one heating-cooling unit connected to the air handling system, which at least one heating-cooling unit is operable to transfer heat into or out of air passing within the air handling system of the building, and which at least one heating-cooling unit includes at least one chilled beam;
    a primary water storage device operable to store a volume of water within a predetermined temperature range, which primary water storage device is in communication with the hot water source and the cold water source;
    at least one first heat pump connected to the primary water storage device and the at least one chilled beam of the at least one heating-cooling unit; and
    a controller adapted to selectively drive the first heat pump to transfer heat between the primary water storage device and the chilled beam of the at least one heating-cooling unit, and adapted to selectively control the system to transfer heat into or out of the primary water storage device to maintain the water within the primary storage device within the predetermined temperature range, and adapted to operate a second heat pump to transfer heat from the hot water source to the primary storage device to increase the temperature of water disposed within the primary water storage device.

2. The system of claim 1, wherein the first heat pump is a water-to-water heat pump.

3. The system of claim 1, further comprising an air-source heat pump that is operable to transfer heat between the water within the primary storage device and ambient air, wherein the controller is adapted to control the transfer of heat between the water within the primary storage device and ambient air.

4. The system of claim 1, wherein the controller is adapted to selectively transfer heat from the primary storage device to the cold water source to decrease the temperature of water disposed within the primary water storage device.

5. The system of claim 4, wherein the cold water source is a potable source of cold water within the building.

6. The system of claim 4, wherein the hot water source is a potable source of hot water within the building.

7. The system of claim 1, further comprising a hot water storage device and a second heat pump, wherein a second heat pump is connected to the primary water storage device and the hot water storage device, and the controller is adapted to selectively operate the second heat pump to transfer heat from the hot water storage device to the primary storage device to increase the temperature of water disposed within the primary water storage device.

8. The system of claim 7, further comprising a cold water storage device and a third heat pump, wherein the third heat pump is connected to the primary water storage device and the cold water storage device, and the controller is adapted to selectively operate the third heat pump to transfer heat from the primary water storage device to the cold water storage device to decrease the temperature of water disposed within the primary water storage device.

9. The system of claim 1, wherein at least one of the at least one heating-cooling unit and at least one of the first heat pump are configured in a modular unit disposed within the system.

10. The system of claim 9, wherein one or more modular units is sized to fit within a ceiling space of a building.

11. A method for conditioning air within an air handling system of a building, which building has a hot water source and a chilled water source, the method comprising the steps of:
transferring heat into or out of air passing within the air handling system of the building using at least one heating-cooling unit connected to the air handling system, which at least one heating-cooling unit includes at least one chilled beam;
storing a volume of water within a primary water storage within a predetermined temperature range, which primary water storage device is in communication with the hot water source and the cold water source;
transferring heat between the primary water storage device and the chilled beam of the at least one heating-cooling unit; and
transferring heat into or out of the primary water storage device to maintain the water within the primary storage device within the predetermined temperature range, said transferring heat into or out of the primary water storage device including transferring heat from the hot water source to the primary storage device to increase the temperature of water disposed within the primary water storage device.

12. The method of claim 11, wherein a water-to-water heat pump transfers heat between the primary water storage device and the chilled beam of the at least one heating-cooling unit.

13. The method of claim 11, further comprising the step of: transferring heat between the water within the primary storage device and ambient air using an air-source heat pump.

14. The method of claim 11, wherein the step of transferring heat into or out of the primary water storage device to maintain the water within the primary storage device within the predetermined temperature range includes the step of:
selectively transferring heat from the primary storage device to the cold water source to decrease the temperature of water disposed within the primary water storage device.

15. The method of claim 14, wherein the hot water source is a potable source of hot water within the building.

16. The method of claim 11, wherein the step of transferring heat into or out of the primary water storage device to maintain the water within the primary storage device within the predetermined temperature range includes the steps of:
selectively transferring heat from a hot water storage device to the primary storage device using a water-to-water heat pump to increase the temperature of water disposed within the primary water storage device; or
selectively transferring heat from the primary storage device to a cold water storage using a water-to-water heat pump to decrease the temperature of water disposed within the primary water storage device.

17. The method of claim 16, wherein the cold water storage device is connected to the source of cold water within the building.

18. The method of claim 16, wherein the hot water storage device is connected to the source of hot water within the building.

19. The method of claim 11, further includes providing a plurality of heating-cooling units and a plurality of first heat pumps, which heating-cooling units and first heat pumps are configured in modular units disposed within the system; and
wherein the step of transferring heat into or out of air passing within the air handling system of the building uses the modular units.

20. The method of claim 19, further comprising the step of disposing one or more of the modular units within a ceiling space of the building.

21. The method of claim 19, wherein the modular units are disposed on a plurality of floors of the building and the step of transferring heat into or out of air passing within the air handling system is performed on a floor-by-floor basis.

* * * * *